United States Patent  (10) Patent No.: US 7,527,492 B2
Fortes  (45) Date of Patent: May 5, 2009

(54) DEVICE FOR ROUNDING OF DOUGH PIECES

(76) Inventor: Trevor Fortes, Dalkantsvagen 22 SE-141 41, Huddinge (SE)

( * ) Notice: Subject to any disclaimer, the term of this patent is extended or adjusted under 35 U.S.C. 154(b) by 0 days.

(21) Appl. No.: 11/568,754

(22) PCT Filed: May 3, 2005

(86) PCT No.: PCT/SE2005/000640

§ 371 (c)(1),
(2), (4) Date: Nov. 6, 2006

(87) PCT Pub. No.: WO2005/107477

PCT Pub. Date: Nov. 17, 2005

(65) Prior Publication Data

US 2007/0166422 A1   Jul. 19, 2007

(30) Foreign Application Priority Data

May 12, 2004   (SE)   .................... 0401227

(51) Int. Cl.
*B28B 1/00* (2006.01)
*A21D 6/00* (2006.01)

(52) U.S. Cl. .................. 425/332; 425/333; 425/364 R; 428/496

(58) Field of Classification Search ............ 425/332, 425/333, 364 R, 284, 287, 292, 295, 298, 425/94; 83/32, 510; 426/496, 512
See application file for complete search history.

(56) References Cited

U.S. PATENT DOCUMENTS

| 978,440 | A | * | 12/1910 | Eggenhofer | .................. 425/300 |
| 1,931,499 | A | * | 10/1933 | Klugh | .................. 425/200 |
| 2,245,284 | A | | 6/1941 | Lockwood | |
| 2,858,775 | A | * | 11/1958 | Marasso | .................. 425/241 |
| 3,199,871 | A | * | 8/1965 | Dorn | .................. 473/609 |
| 3,448,697 | A | * | 6/1969 | Atwood | .................. 425/332 |
| 3,521,578 | A | | 7/1970 | Fraioli | |

(Continued)

FOREIGN PATENT DOCUMENTS

JP   10236622 A * 9/1998

OTHER PUBLICATIONS

International Search Report PCT/SE2005/000640 dated Jul. 7, 2005 (Swedish Patent Office).

*Primary Examiner*—Philip C Tucker
*Assistant Examiner*—Dimple N Bodawala
(74) *Attorney, Agent, or Firm*—Ostrolenk, Faber, Gerb & Soffen, LLP

(57) ABSTRACT

Device for the rounding of dough pieces, comprising a support surface for the dough pieces, an elongate rounding rail having a concave rounding surface, the rounding rail extending to the support surface, members being provided in order to move the rounding rail in relation to the support surface having the dough pieces carried thereby, the longitudinal direction of the rail forming an acute angle to the direction of motion of the dough pieces, whereby the dough pieces being kneaded and rounded while rolling off on the rounding surface. The rounding surface is provided with a plurality of recesses distributed over the rounding surface and open toward the rounding surface, which recesses have a diameter in the range of 5-15 mm and a depth in the range of 3-8 mm

14 Claims, 3 Drawing Sheets

U.S. PATENT DOCUMENTS

| | | | |
|---|---|---|---|
| 4,719,117 A * | 1/1988 | Simelunas | 426/502 |
| 4,793,789 A * | 12/1988 | Muller | 425/332 |
| 5,714,178 A | 2/1998 | Keener | |
| 5,786,016 A | 7/1998 | Campbell et al. | |
| 6,123,537 A * | 9/2000 | Cummins et al. | 425/332 |
| 6,159,517 A * | 12/2000 | Watts et al. | 426/496 |
| 6,203,828 B1 * | 3/2001 | Thota et al. | 426/76 |
| 6,224,365 B1 * | 5/2001 | Ou-Young | 425/332 |
| 6,382,952 B1 * | 5/2002 | Cummins et al. | 425/332 |
| 6,953,596 B2 * | 10/2005 | Maniak et al. | 426/503 |
| 7,156,642 B2 * | 1/2007 | Anderson et al. | 425/297 |
| 7,316,556 B2 * | 1/2008 | Maniak et al. | 425/306 |
| 2002/0034573 A1 * | 3/2002 | McNeel et al. | 426/549 |
| 2002/0037336 A1 * | 3/2002 | Oki et al. | 425/183 |

\* cited by examiner

DEVICE FOR ROUNDING OF DOUGH PIECES

CROSS REFERENCE TO RELATED APPLICATION

The present application is a 35 U.S.C. §§ 371 national phase conversion of PCT/SE2005/000640, filed 3 May 2005, which claims priority of Swedish Patent Application No.0401227-4 filed 12 May 2004, which is herein incorporated by reference. The PCT International Application was published in the English language.

BACKGROUND OF THE INVENTION

The invention relates to a device for the rounding of dough pieces comprising a support surface for dough pieces, of the kind that is a device for the rounding of dough pieces, comprising a support surrounding surface for the dough pieces, an elongate rounding rail having a concave rounding surface, the rounding rail extending to the support surface, members being provided in order to move the rounding rail in relation to the support surface having the dough pieces carried thereby, the longitudinal direction of the rail forming an acute angle (u) to the direction of motion of the dough pieces, whereby the dough pieces being kneaded and rounded while rolling off on the rounding surface, wherein the rounding surface is provided with a plurality of recesses distributed over the rounding surface and open toward the rounding surface, which recesses have a diameter in the range of 5-15 mm and a depth in the range of 3-8 mm.

Thus, the invention relates to a device of the kind that comprises a support surface carrying dough pieces, an elongate rounding rail, which preferably has a concave rounding surface for the contact with the dough pieces, members being provided in order to mutually move the rounding rail and the support surface having the dough pieces toward each other. The longitudinal axis of the rounding rail preferably forms an acute angle to the direction of motion of the dough pieces toward the rail. Usually, the rounding surface has a part that is adjacent to the support surface and extends perpendicular to the same. The upper parts of the rounding surface are curved in order to extend generally parallel to the support surface, in over the arriving dough pieces.

The prior art is represented by, for instance, U.S. Pat. Nos. 5,786,016, 6,382,952 B1 and 5,714,178.

A problem in devices of the kind in question is that the dough pieces tend to stick to the rounding surface of the rounding rail, so that dough particles deposit at an increasing extent during operation and will thereby increase the amount of dough that sticks to the rounding rail, so that the dough pieces eventually get an unsatisfactory rounding and an unsatisfactory surface state.

It is previously known to form the dough-contacting surface of the rounding rail from a material having low adhesion to the dough. But simultaneously, the dough pieces have to interact with the rounding rail so that they are conveyed into a rotary motion along the rounding rail for the forming of the desired rounding and the desired rounding effect. In that connection, it is known to form the-rounding rail with a defined roughness, the surface having a plurality of small depressions having a depth of approx. 0.25 mm; but this roughness naturally increases the risk of dough particles becoming stick and disturbing the rounding effect.

Furthermore, the wear of the rounding surface is increased since the bodies in the rough structure get a particularly extensive contact with the dough pieces and accordingly experience a wear, which entails that the friction in question decays, so that the rounding rail has to be exchanged in order to present the intended rounding effect.

SUMMARY OF THE INVENTION

Therefore, an object of the invention is to provide a rounding rail that presents a relatively high friction between the rail and the dough pieces, but which yet presents a favourable loosening of the dough pieces from the surface of the rounding rail upon the rolling off of the dough pieces on the same and the wear of the surface of the rounding rail being decreased.

The object is attained by the invention.

Embodiments of the invention are defined in the appended dependent claims.

The invention essentially means that the rounding rail's rounding surface, which suitably is formed from a material having low adhesion to the dough pieces, for instance Teflon® or the like, is provided with a plurality of recesses open toward the rounding surface and having a diameter in the range of 5-15 mm and a depth of 3-10 mm. Teflon is a trademark for products made from any of several types materials, including fluorine-containing polymers. fluoropolymers or the like. By means of such depressions, it is attained, in connection with the rounding/kneading of a dough piece, that the dough piece temporarily traps an air cushion in the recess. By the fact that the recess has a diameter in the mentioned interval, the surface of the dough piece may bulge in a certain distance into the outer part of the recess, whereby the edge of the recess gets a certain form binding to the surface of the dough piece, and in this way presents a good friction between the rounding surface and the dough piece, so that the dough piece can be imparted the intended kneading/rolling off along the rounding rail and the support surface.

When the surface of the dough sealingly penetrates into the mouth of the recess, the air cushion trapped therein is compressed. Immediately before the dough piece rolls off from a recess, the abutment pressure of the dough piece against the rounding surface is reduced, and expands the air cushion so that the dough leaves the recess, whereby the dough piece readily can release from the engagement with the edge of the recess.

In preferred embodiments of the invention, the recesses have a depth of approx. 0,5 cm and a diameter of approx. 1 cm, wherein the recesses can be in the form of borings or circular cylindrical recesses. The recesses may be established in elements that form the rounding surface of the rounding rail and consist of a material having a high wear resistance and a low friction, for instance Teflon®. Usually, the rounding rail is mounted stationary and the support surface is formed by an endless rotationally driven conveyor belt.

In preferred embodiments, the rounding rail is built up by a stand, along which a plurality of surface elements are releasably mounted, the elements being individually replaceable, for instance upon damage or wear, and the elements being provided with recesses and consist, for instance, of Teflon.

In the following, the invention will be described in the form of examples, reference being made to the appended drawing.

DESCRIPTION OF A PREFERRED EMBODIMENT

Figure 1:
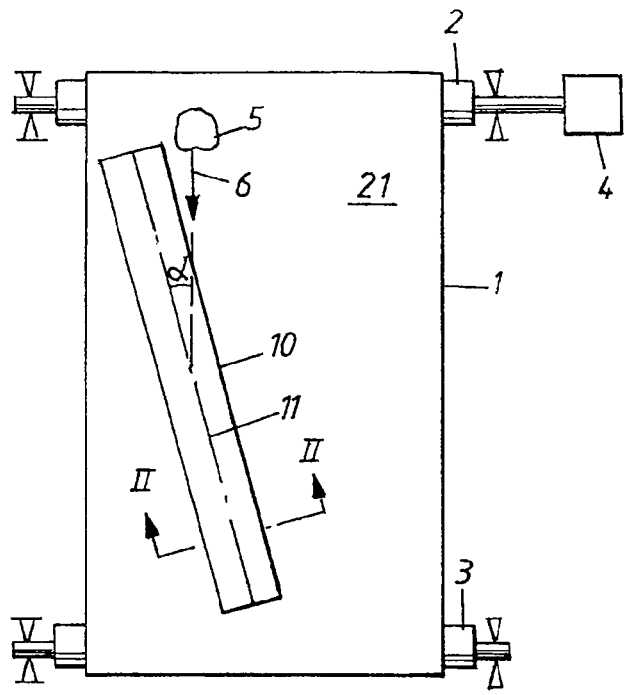
FIG. 1 shows schematically a planar view of a device for the rounding of dough pieces.
Figure 2:
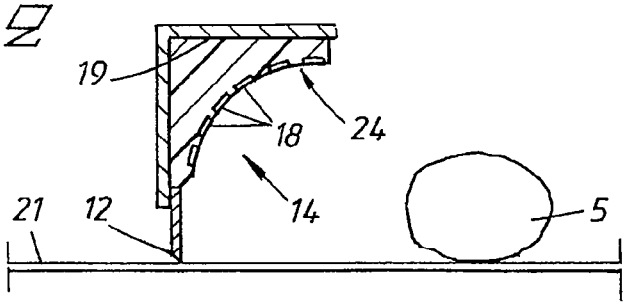
FIG. 2 shows a section view taken along line II-II in FIG. 1.
Figure 3:
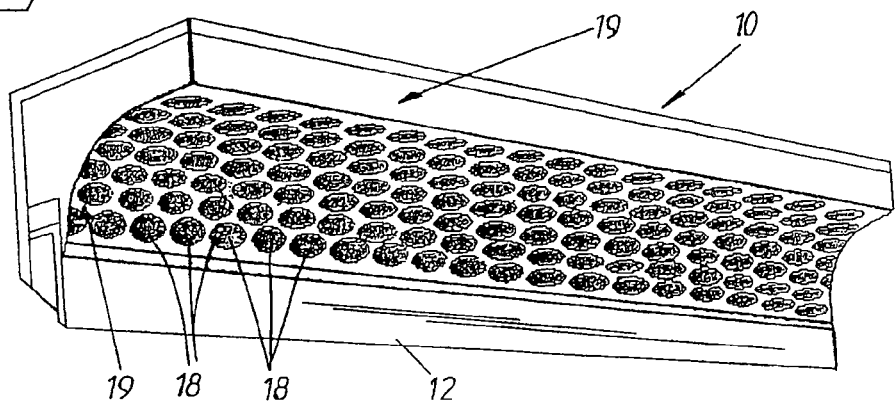
FIG. 3 shows a perspective depiction of a rounding rail included in the device according to FIG. 1.

In FIG. 1, an endless conveyor belt 1 is shown, which runs over two rotary mounted rolls 2, 3, one of which, 2, is rotationally driven by a motor 4. The belt 1 has an upper generally horizontal part, on which a dough piece 5 is deposited, wherein the dough piece will be transported in the direction shown by the arrow 6. A rounding rail 10 is stationary mounted adjacent to the upper part of the belt 1 and has a longitudinal axis 11, which forms an acute angle a to the conveying direction of the dough piece 5. The rail 10 has a scraping blade 12, which is adjacent to the upper part 21 of the belt 1, and further has a single-curved surface 14, the concave side of which is facing the arriving dough piece 5. The surface 14 has a first end portion, which is generally perpendicular to and adjacent to the surface of the part 21. The opposite end edge of the surface 14 is in general parallel to the surface of the part 21 and extends in above the arriving dough piece 5.

Figure 4:
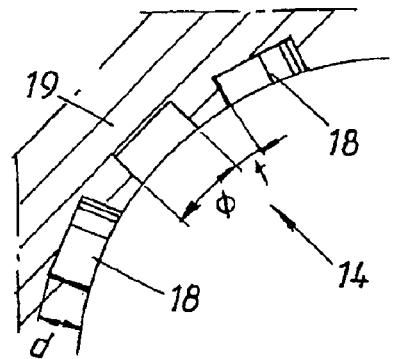
FIG. 4 shows a section through the rounding surface of the rounding rail.

According to a feature of the invention, the surface 14 is provided with a plurality of recesses 18 (FIG. 4), which are adjacent to each other and which have a diameter $\Phi$ in the range of 5-15 mm and a depth d in the range of 3 to 8 mm. The distance t between the recesses 18 is preferably minimized and the smallest distance between adjacent circular cylindrical recesses 18 is preferably at most approx. 2,5 mm.

The material 19 of the rail 10 exposed on the surface 14 may be composed of a solid material suitable for baking-production equipment, for instance UHMW plastic.

Figure 5:
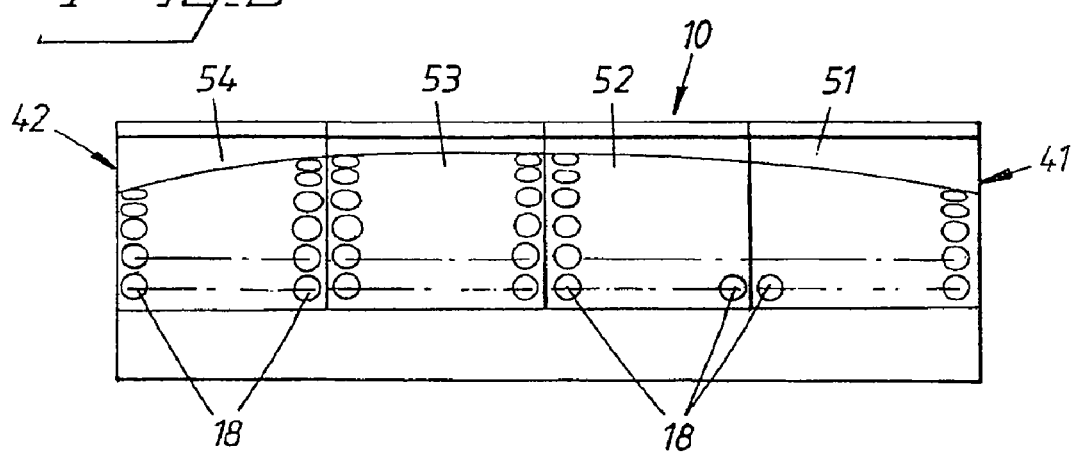
FIG. 5 shows a front view of a rounding rail.
Figure 6:
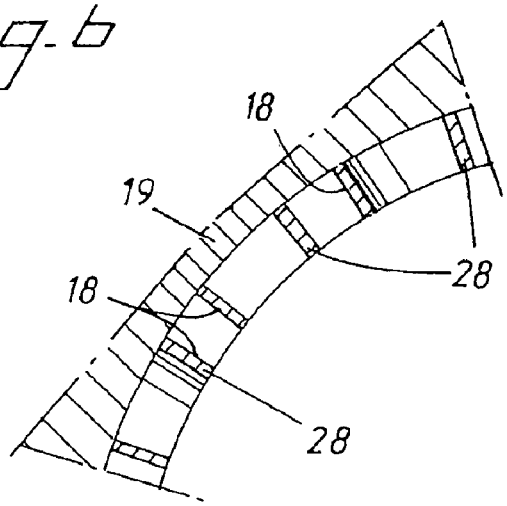
FIG. 6 shows a variant of the embodiment according to FIG. 4.

In an alternative embodiment, see FIG. 6, the recesses 18 may be defined by bushings 28, which are inserted into the corresponding recesses in the surface material 19. In this way, it is attained that the tubular bushings 28 can be produced from a plastic having a particularly low friction, for instance Teflon®, the ring-shaped end surfaces of the bushings 28 being exposed in the rounding surface 14 to contact the dough pieces. When a dough piece 5 being rolled off on the surface 14, the surface thereof will cover a recess 18 and, in doing so, containing an air cushion therein. When the dough piece is pressed against the surface 14, the surface thereof will partially penetrate into the mouth of the recess 18, the mouth edge of the recess presenting a conveying of the dough piece along the surface 14. When the dough piece 5 rolls off from the recess 18, the compressive load of the dough piece against the recess 18 decreases and the compressed air cushion is allowed to push out the part of the dough piece 5 that previously has penetrated into the recess 18. In this way, the risk of dough particles sticking to the surface 14 decreases, at the same time as the surface 14 has a structure that presents high friction against the surface of the dough piece so that sliding is avoided and rolling off is favoured. In FIG. 5, it is shown that the part 24 of the surface 14, which is generally parallel to the nearby part 21 of the belt 1, may have a varying height along the length thereof in order to guarantee a favourable progress of the rounding/kneading of the dough piece. At the upstream end 41 of the rail 10, the surface part 24 is on a relatively low level, which slowly rises in order to reach a maximum in a position beyond the half-length of the rail 10, and then fall again toward the downstream end 42 of the rail.

From FIG. 5, it is also possible to recognize that the rounding surface 14 of the rounding rail 10 is established by a plurality of consecutive sections 51, 54, which are releasably mounted on a stand and hence can be exchanged individually when wear or damage has arisen. Furthermore, the sections 51, 54 may be provided in different lengths in order to enable construction of rounding surfaces/rails of selectable effective rounding length.

Figure 7:
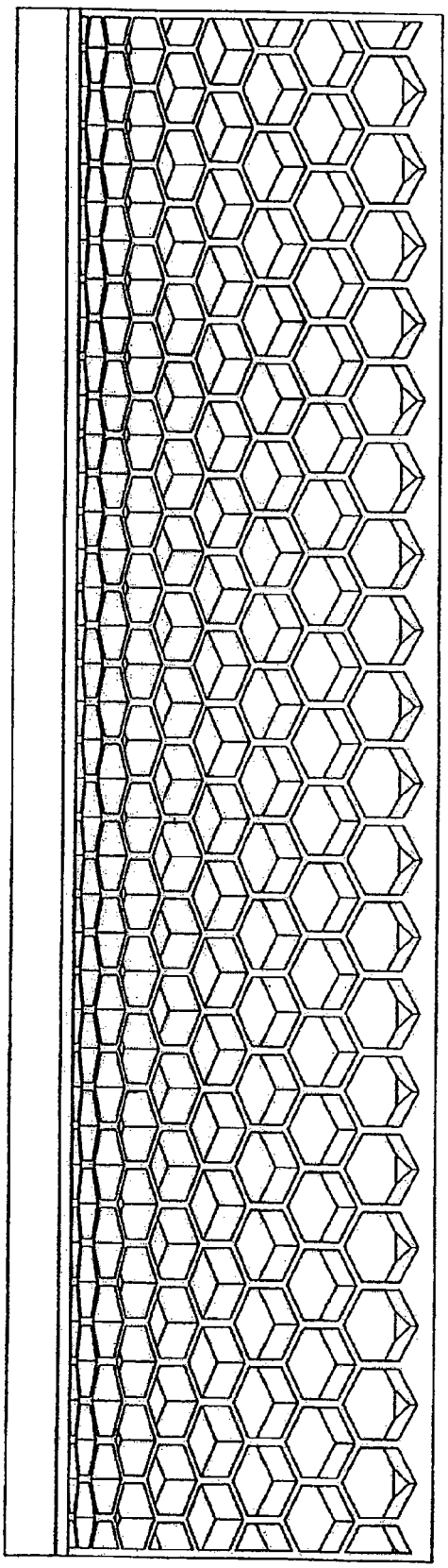
FIG. 7 shows a front view of an embodiment of the rounding rail for the device illustrated in FIG. 1.

FIG. 7 illustrates an embodiment of the rounding rail, including the lattice strips and the equilateral regular hexagonal recesses.

Naturally, the rail 10 is foldable in respect of the angle a in relation to the direction of traversing of the dough piece 5, and naturally the device according to FIG. 1 may comprise a plurality of generally parallelly arranged rails 10 for parallel processing of a plurality of dough pieces 5.

The recesses may advantageously be placed with mutually minimized distance in the rounding surface. In that connection, it is advantageous if the rounding surface is in the form of a lattice defined by the recess openings and being of straight strips having a substantially even and substantially equal strip width. Thus, in preferred embodiments, the recesses have a polygonal cross section such that the opening of the recess in the rounding surface is polygonal, the edges of adjacent openings being parallel and defining a lattice strip. Since the dough seems to have an enhanced tendency of adhering to the strip the wider the strip is, embodiments having lattice strips of even and small width should decrease the risk of gumming. On the other hand, the strips should not be so narrow that the dough gets stuck because of the walls carrying the strips cutting into the dough piece. The lattice strip width may, for instance, be about 1 mm and a, for instance, hexagonal opening may have a diameter of up to approx. 15 mm.

One of the advantages is that dough pieces of increased water content, i.e. looser consistency, can be processed by means of the device.

The invention claimed is:

1. A device for rounding dough pieces, the device comprising:
    a support surface for carrying the dough pieces in a direction of motion;
    an elongate rounding rail having a concave rounding surface configured to knead and round the dough pieces, the rounding rail extending to the support surface, a longitudinal direction of the elongate rounding rail forming an acute angle ($\alpha$) to the direction of motion,
    wherein the elongate rounding rail includes a plurality of confined recesses distributed over the elongate rounding rail each confined recess of the plurality of confined recesses being closed on all sides except for a single aperture formed only in the concave rounding surface.

2. The device according to claim 1, wherein the elongate rounding rail comprises a supporting structure on which a plurality of surface elements are releasably mounted to be adjacent to each other along the elongate rounding rail, the surface elements being provided with the recesses.

3. The device according to claim 2, wherein the surface elements are formed of a material having a low friction against the dough pieces, said material comprising PTFE.

4. The device according to claim 1, wherein the rounding rail has a scraping blade including an edge adjacent to the support surface, the blade standing substantially perpendicular to the support surface.

5. The device according to claim 1, wherein the support surface comprises an upper part of a driven endless belt.

6. The device according to claim 1, wherein the recesses each have a diameter of 1 cm and a depth of 0.5 cm and are substantially cylindrical with a circular cross-section.

7. The device according to claim 1, wherein the aperture of each recess is a polygon, the recesses being close-packed, whereby the concave rounding surface includes a lattice of strips having a substantially equal width along a length thereof.

8. The device according to claim 7, wherein the width of the lattice of strips is at most 2.5 mm.

9. The device according to claim 7, wherein the polygons are substantially equilateral regular hexagons and the lattice of strips have a width of about 1 mm.

10. The device according to claim 8, wherein the polygons are substantially equilateral regular hexagons and that the lattice of strips have a width of about 1 mm.

11. The device according to claim 1, wherein the aperture is circular or polygon-shaped.

12. The device of claim 1, wherein each recess has a diameter in a range of 5-15 mm and a depth in a range of 3-8 mm.

13. The device of claim 1, wherein the aperture of each recess is a convex cyclic equilateral polygon.

14. The device according to claim 2, wherein the surface elements are formed of a material having a low friction against the dough pieces, said material comprising plastic.

* * * * *